(12) United States Patent
Damen

(10) Patent No.: US 11,349,980 B2
(45) Date of Patent: May 31, 2022

(54) ANTI-TAMPERING MECHANISMS FOR A MOBILE DEVICE LOCK

(71) Applicant: SafeDrivePod International B.V., Oosterbeek (NL)

(72) Inventor: Erik Petrus Nicolaas Damen, Oosterbeek (NL)

(73) Assignee: SafeDrivePod International B.V., Oosterbeek (NL)

( * ) Notice: Subject to any disclaimer, the term of this patent is extended or adjusted under 35 U.S.C. 154(b) by 460 days.

(21) Appl. No.: 15/852,937

(22) Filed: Dec. 22, 2017

(65) Prior Publication Data
US 2018/0183924 A1    Jun. 28, 2018

(30) Foreign Application Priority Data

Dec. 23, 2016  (EP) ..................................... 16206873

(51) Int. Cl.
*H04M 1/72463* (2021.01)
*H04W 4/029* (2018.01)
(Continued)

(52) U.S. Cl.
CPC ...... *H04M 1/72463* (2021.01); *G06F 21/629* (2013.01); *H04M 1/72454* (2021.01); *H04W 4/026* (2013.01); *H04W 4/029* (2018.02); *H04W 4/40* (2018.02); *H04W 12/08* (2013.01); *H04W 48/04* (2013.01); *G06F 2221/2147* (2013.01); *H04M 1/6075* (2013.01); *H04M 1/67* (2013.01); *H04M 2250/12* (2013.01)

(58) Field of Classification Search
CPC ..................... H04W 4/48; H04W 4/46; G05B 2219/24158; G05B 2219/36547
See application file for complete search history.

(56) References Cited

U.S. PATENT DOCUMENTS 6,362,778 B2 * 3/2002 Neher ................... G01S 5/0018
342/357.75
8,750,904 B2   6/2014 Mader et al.
(Continued)

OTHER PUBLICATIONS

European Search Report dated Jul. 4, 2017 for corresponding European Application No. 16206873.8, filed Dec. 23, 2016.

*Primary Examiner* — German Viana Di Prisco
(74) *Attorney, Agent, or Firm* — Steven M. Koehler; Westman, Champlin & Koehler, P.A.

(57) ABSTRACT

In an aspect, a method of preventing tampering of a mobile device lock, wherein the method comprises: a client application executed in a mobile device monitoring the reception of presence messages transmitted, e.g. broadcast, by a user-detecting device in the vehicle, the user-detecting device comprising a radio interface configured to wirelessly transmit presence messages when the vehicle is moving, preferably the presence message comprising an identification code, preferably a MAC address, of the user detecting device. The client application repeatedly, for example periodically or regularly, wirelessly transmitting notification messages to a server in a network, the notification messages signaling the server that the client application is being executed on the mobile device. The client application determines if the user is inside the vehicle; monitors the velocity of the vehicle and locks the mobile device; and monitors user interaction with the mobile device.

20 Claims, 6 Drawing Sheets

(51) Int. Cl.
  *H04W 4/02* (2018.01)
  *H04W 12/08* (2021.01)
  *H04W 4/40* (2018.01)
  *H04M 1/72454* (2021.01)
  *G06F 21/62* (2013.01)
  *H04W 48/04* (2009.01)
  *H04M 1/60* (2006.01)
  *H04M 1/67* (2006.01)

(56) References Cited

U.S. PATENT DOCUMENTS

| | | | |
|---|---|---|---|
| 9,661,127 B1* | 5/2017 | Singh | H04W 4/029 |
| 2011/0009107 A1* | 1/2011 | Guba | G08G 1/20 |
| | | | 455/418 |
| 2012/0214463 A1 | 8/2012 | Smith et al. | |
| 2013/0029650 A1* | 1/2013 | Xiao | H04W 4/027 |
| | | | 455/417 |
| 2013/0145007 A1* | 6/2013 | Randazzo | H04L 67/22 |
| | | | 709/223 |
| 2013/0247117 A1* | 9/2013 | Yamada | G08C 17/02 |
| | | | 725/93 |
| 2013/0316737 A1 | 11/2013 | Guba et al. | |
| 2014/0113593 A1* | 4/2014 | Zhou | H04L 63/20 |
| | | | 455/411 |
| 2014/0302834 A1* | 10/2014 | Jones | H04W 4/40 |
| | | | 455/418 |
| 2015/0054618 A1* | 2/2015 | Yamane | G07C 9/00309 |
| | | | 340/5.72 |
| 2015/0213555 A1* | 7/2015 | Barfield, Jr. | G06Q 40/08 |
| | | | 705/4 |
| 2015/0240531 A1* | 8/2015 | Blust | G07C 9/00571 |
| | | | 340/5.5 |
| 2016/0242014 A1* | 8/2016 | Mayer | H04W 4/18 |
| 2016/0347281 A1* | 12/2016 | Wu | B60L 1/02 |
| 2017/0032635 A1* | 2/2017 | Wilson | G08B 13/14 |
| 2017/0078474 A1* | 3/2017 | Mahar | H04L 67/12 |
| 2018/0124233 A1 | 5/2018 | Abramson | |

* cited by examiner

ANTI-TAMPERING MECHANISMS FOR A MOBILE DEVICE LOCK

FIELD OF THE INVENTION

The discussion below is merely provided for general background information and is not intended to be used as an aid in determining the scope of the claimed subject matter.

Aspects of the invention relate to anti-tampering mechanisms for a mobile device lock, and, in particular, though not exclusively, to methods and systems for preventing tampering of a mobile device lock and a computer program product for executing such methods.

BACKGROUND OF THE INVENTION

More and more traffic accidents occur because of drivers being distracted by mobile devices. People tend to respond immediately when a new message arrives, even though one knows that such response is dangerous. Moreover, the increasing capabilities of a smartphone and the availability of a high-bandwidth wireless connection, other features such as video streaming are possible which may form an even more dangerous distraction for a driver. Countries have regulations that prohibit the use of a smartphone during driving, but it is difficult for authorities to enforce these regulations at all times.

Mobile software applications exist that may help a driver to avoid distraction by a smartphone. Most of these applications however can be easily circumvented because it is not easy to completely lock the phone. Operating systems often do not allow a software application to control all the functions of the mobile device. For example, for security reasons, in many cases the operating system uses sandboxes that provide a restricted operating system environment for restricting access of the application to functions beyond the sandbox.

In another system for detecting, reporting and discouraging the use of a mobile device in a vehicle, a special-purpose in-vehicle device is connected to the vehicle management system in order to collect vehicle data, including data for determining whether the vehicle is moving at a certain speed. Further, the in-vehicle device comprises a frequency scanner that can detect wireless transmission of a mobile phone in the vehicle. The vehicle data and the information on wireless transmissions in the vehicle are then sent to a server in the network for further analysis and alert messages can be sent to the user if unsecure use of the mobile device is detected.

A problem related to the use of such in-vehicle device is that it represents a special purpose hardware device that should be installed in the vehicle and connected to the computer of the vehicle to obtain the vehicle data. Such in-vehicle device should be implemented such that it can be connected to different computers systems of different types of vehicles and such that it can read and interpret different types parameters and data formats. Designing such device is a difficult and expensive task as currently no single standard for such device exists. Furthermore, the in-vehicle device only detects that a smartphone is used in the vehicle in an insecure way but does not actively prevents the user from accessing it.

A system creates a driver behavior prediction model that permits to make a driver prediction regarding a particular user. Such a system can aid an insurance provider who wishes to determine the insurance costs for the user. The system creates a prediction model on the basis of driving information collected by a user device and a vehicle device connected to the vehicle of the user. Although the system is able to collect information about the driver, it cannot actively discourage a driver from accessing a smart phone.

Hence, there is a need in the art for improved anti-tampering schemes for a smart phone lock. In particular, there is a need in the art for methods and systems that provide improved anti-tampering functionality for a mobile device lock that prevents access of the user of the mobile device.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an aim of the invention to prevent users from tampering a mobile device lock. In an aspect, the invention relates to a method of preventing tampering of a mobile device lock, wherein the method comprises: a client application executed in a mobile device monitoring the reception of presence messages transmitted, e.g. broadcast, by a user-detecting device in the vehicle, the user-detecting device comprising a radio interface configured to wirelessly transmit presence messages when the vehicle is moving, preferably the presence message comprising an identification code, preferably a MAC address, of the user detecting device;

the client application repeatedly, for example periodically or regularly, wirelessly transmitting notification messages to a server in a network, the notification messages signaling the server that the client application is being executed on the mobile device;

the client application determining on the basis of a received presence message that the user of the mobile device is inside the vehicle;

the client application monitoring the velocity of the vehicle and locking the mobile device for preventing the user to access the mobile device if the velocity of the vehicle is above a predetermined threshold;

the client application monitoring user interaction with the mobile phone and transmitting information associated with the user detecting device and/or the mobile device and/or the client application running on the mobile device and/or the location and/or speed of the vehicle in the notification messages to the server; and, the mobile device receiving a warning message from the server, if the server determines on the basis of the information in the notification messages an indication that the user is tampering with the mobile device lock.

Another aspect of this invention relates to a system for preventing tampering of a mobile device lock when the user of a mobile device is driving a vehicle, the system comprising a client application executable in a mobile device, a user-detecting device and a server:

the client application being configured to monitor the reception of presence messages transmitted, e.g. broadcast, by a user-detecting device in the vehicle, the user-detecting device comprising a radio interface, the user detecting device being configured to wirelessly transmit presence messages when the vehicle is moving, preferably the presence message comprising an identification code, preferably a MAC address, of the user detecting device;

the client application being configured to repeatedly wirelessly transmit notification messages to a server in a network, the notification messages signaling the server that the client application is being executed on the mobile device;

the client application being configured to determine on the basis of a received presence message that the user of the mobile device is inside the vehicle;

the client application being configured to monitor the velocity of the vehicle and to lock the mobile device for preventing the user to access the mobile device if the velocity of the vehicle is above a predetermined threshold;

the client application being configured to monitor user interaction with the mobile phone and transmit information associated with the user detecting device and/or the mobile device and/or the client application running on the mobile device and/or the location and/or speed of the vehicle in the notification messages to the server; and, the mobile device being configured to receive a warning message from the server, if the server determines on the basis of the information in the notification messages an indication that the user is tampering with the mobile device lock.

The user-detecting device may comprise a motion sensor and the user-detecting device may be configured to wirelessly transmit the presence messages in response to the motion sensor detecting that the vehicle is moving.

Optionally, the client application may (be configured to) lock the mobile device for preventing the user to access the mobile device if at least two conditions (i) and (ii) are satisfied: (i) the velocity of the vehicle is above a predetermined threshold and (ii) the client application has determined that the user of the mobile device is inside the vehicle.

The client application may (be configured to) monitor user interaction with the mobile phone in response to locking the mobile device and/or while the mobile phone is locked.

Hence, an aspect of the invention includes a client application that is executable on a mobile device, preferably in the background of the mobile device, wherein the client application is configured to detect presence messages of a driver detecting device, i.e. a device that is configured to detect an indication that the user of the mobile device is inside a vehicle. To that end, the driver detecting device may comprise a motion sensor, e.g. an accelerometer or the like, and a radio interface such as a Bluetooth radio-interface for broadcasting presence messages once the motion sensor senses that the vehicle is moving.

Further, the client application transmits notification messages to a server that continuously monitors the reception of the notification messages. Once, the client device receives an indication from the driver detecting device that the vehicle is moving and determines that the velocity is above a predetermined velocity, the client application may lock the mobile device in order to prevent the user to access the mobile device and the client application may start transmitting information about an optional data connection between the user-detecting device and the mobile device and/or about the motion of the vehicle and/or about the user interaction in the notification messages to the server.

Hence, the invention provides a simple low-cost solution that can be used with any mobile device and that actively intervenes when user tries to tamper the mobile device or the client application running on the mobile device (e.g. terminating data connection between user detection device and mobile device, e.g. by turning of Bluetooth interface, undo lock screen, turn off app, etc.).

In an embodiment, the mobile device may (be configured to) receive a warning message, if the server detects on the basis of the information in the notification messages that, while the vehicle is in motion, a data connection between the user-detecting device and the mobile device is terminated; and/or that the user interacts with the locked mobile device.

In an embodiment, the mobile device may (be configured to) receive a warning message, if the server detects on the basis of the information in the notification messages that, the user has turned off the radio interface configured to wirelessly receive presence messages; and/or, the user interacts with the locked mobile device; and/or, the user has pressed the emergency button; and/or, the user has terminated the client application. Such embodiments are advantageous because the user may be provided direct feedback. The user can thus be immediately discouraged to continue tampering with the system.

In an embodiment, the client application may (be configured to) be executed as a background process; and/or, wherein the data connection between the client detecting device and the mobile device is a Bluetooth radio connection.

In an embodiment, the client application may (be configured to) be executed as a background process; and/or may (be configured to) establish, when a presence message is received by the client application, a data connection, preferably a Bluetooth radio connection, between the user-detecting device and the mobile device. The data connection is beneficial because a (changing) state of the connection may be indicative for tampering with the system.

In an embodiment, the method may further comprise a further client application repeatedly, e.g. periodically or regularly, determining the status of the client application; the further client application restarting the client application if the status of the client application indicates that the client application has terminated. In an embodiment, the system comprises such further client application. Such a further client application may safeguard that the client application is switched on.

In a further embodiment, the client application may (be configured to) repeatedly, e.g. periodically and regularly, determine the status of the further client application, the client application restarting the further client application if the status of the further client application indicates that the further client application is terminated. This is beneficial, because it may prevent that the further client application is switched off.

In an embodiment, the client application may (be configured to) lock access to the mobile device by sending a code over a wireless data connection to the user detecting device; the user-detecting device transmitting in response to the reception of the locking code, an instruction to the mobile device, e.g. to an operating system (OS) of the mobile device (i.e. an OS-level instruction), to lock the screen or to switch the mobile device into an idle mode. This embodiment allows to lock access even if a mobile device comprises software that prevents the client application to directly lock the mobile phone, e.g. when the client application is "sandboxed".

In an embodiment, the instruction to lock the mobile device, preferably to lock the screen of the mobile device or to switch the mobile device into an idle mode, may be based on the Human Interface Device protocol, preferably the instructions including a key code for locking the screen or switch the mobile device into an idle mode. This embodiment conveniently uses an existing protocol.

In an embodiment, the client application may periodically or regularly transmit notification messages to the server, the notification message comprising the identification code, preferably a MAC address, of the user detecting device to the server, and/or an identification code of the user, preferably a telephone number or other user id. This embodiment allows for identification of a user.

In an embodiment, the notification messages may comprise at least one of: a telephone number of the mobile device; a time stamp; an identification code, preferably a MAC address of the vehicle-detection device; status information of the radio; user interaction events; detected or estimated speed; status and version of the client application; distance driven; type and version of the operation system; type and version of mobile device. Such information may be useful for the server for determining that a user is tampering.

In an embodiment, a notification message comprises an HTTP message, preferably an HTTP post message, the HTTP message including at least one string of parameters, the parameters defining information about data connection, the motion of the vehicle, and/or the user interaction. This embodiment conveniently uses an existing protocol.

If the user tries to tamper with the system, the client application may send one or more messages to the server with information about the tampering. This way, the server may directly send a message (email, SMS or other notifications) to the user that the tampering should be stopped. Moreover, the information may be stored and will be reported on a weekly, monthly, quarterly or yearly basis to the employer, lease company, insurance company or fleet owner.

The server may (be configured to) determine tampering on the basis of one or more of the following signals:
  Bluetooth on the mobile device is turned off
  application on the mobile device is turned off or removed: the application sends a 'ping' on a regular basis to the mobile device when installed and running (in the background). If this 'ping' is not received by the server, this is considered as tampering
  the distance travelled is estimated using GPS on the mobile device. If the distance is much lower than can be expected based on other available data, it would mean that the user has removed the user detecting device and thus tampers with the system.
  if the user presses the home button, this is an indication that the user tries to open the mobile device. This does not work of course, because the mobile device screen is locked, but still is an indication of the attitude of the user
  if the user performs a hands free call, this is registered by the system.
  if the user is in the car and the application is connected to the user detection device, it is recorded that the user is in the car.

The invention may also relate to a computer program product comprising software code portions configured for, when run in the memory of a computer, executing the method steps according to any of process steps described above.

Further aspects of this disclosure respectively relate to a client application, a mobile device, a user-detecting device, a server, a presence message and a notification message as described herein.

The invention will be further illustrated with reference to the attached drawings, which schematically will show embodiments according to the invention. It will be understood that the invention is not in any way restricted to these specific embodiments.

DETAILED DESCRIPTION

Figure 1:
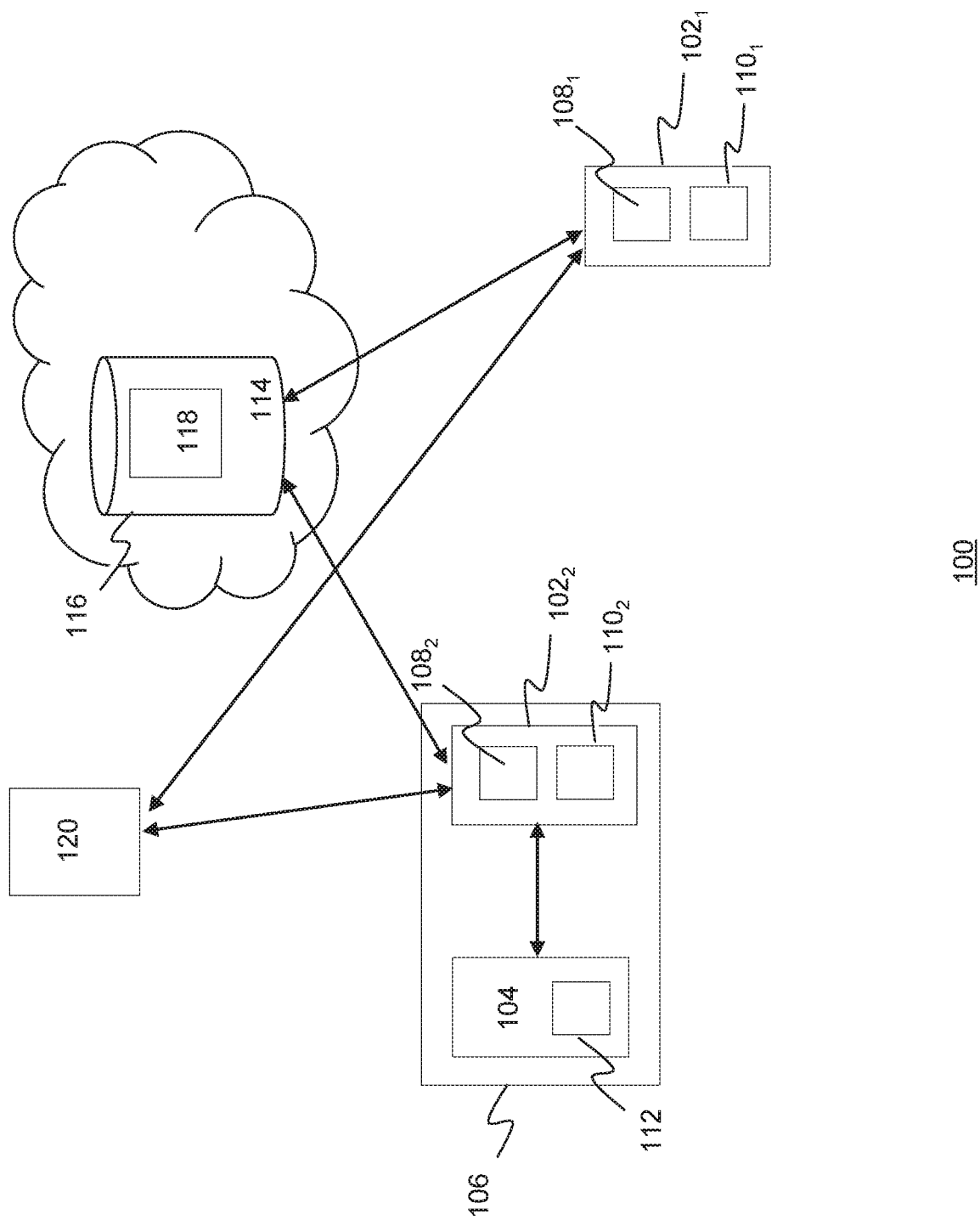
FIG. 1 depicts a system according to an embodiment of the invention.

FIG. 1 depicts a system according to an embodiment of the invention. In particular, FIG. 1 depicts a system comprising mobile devices $102_{1,2}$ comprising a processor $110_{1,2}$ configured to execute a client application $108_{1,2}$ in the background of the mobile device. The client application is configured to lock the mobile device from user access if the user of the device is driving a vehicle. To that end, the system in FIG. 1 comprises one or more anti-tampering functions that are configured to prevent the user from tampering with the mobile device lock. The locking of the mobile device and the anti-tampering functions will be described hereunder in more detail.

The mobile device may be configured as a smartphone or an electronic tablet or the like. The mobile device comprises an user interface, e.g. graphical user interface based on a touch screen or a voice-controlled user interface, for accessing communication functions, e.g. voice or text messaging. Further, the mobile device comprises at least one location service, e.g. a GPS module, for determining the location of the mobile device, one or more short-range data connection interfaces, e.g. a Bluetooth or NFC interface, for establishing a short-range data connection between the mobile device and another device. The mobile device further comprises a motion sensor, e.g. accelerometer, for detecting movements of the mobile device.

The client application is configured to be continuously connected to a server 116 in the network 114 on the basis of a suitable wireless radio connection. For example, the mobile device may be coupled via a radio connection, e.g. a WiFi and/or 2G,3G or LTE radio connection, to the server. Additionally, the client application is configured to ensure that the location service of the mobile device is activated. The location service may be configured as a GPS module receiving location information and time information from a GPS satellite connection 120.

When the client application is installed on the mobile device, the mobile device and the user will be registered with a server application 118 that is running on the server. Once registered, the server application knows that a client application is installed and running in the background of a mobile device and that the client application will periodically or regularly send notification messages, e.g. HTTP messages, to the server. The client application is configured such that it cannot be terminated in a simple way, e.g. a simple user interaction, by a user. Hence, the reception of the notification messages signals the server that the client application is running in the background of the mobile device and that not receiving notification messages from a registered mobile device can be interpreted as tampering the client application.

The information in the notification messages may include information identifying the user and/or mobile device, e.g. the telephone number, an IMSI or other identifiers that may be used for such identification, the status of the location service and short-range data communication interfaces, e.g. Bluetooth interface, and a process identifier identifying the client application that is executed as a background process.

A server application 118 may receive the notification messages and determine that the client application is running as long as the server application receives at least one notification message within a certain time period.

In an embodiment, the client application may be installed in the background of the mobile device such that it cannot be terminated by the user. For example, in an embodiment, when the client application is installed and started, the client application will start a helper program in the background that periodically checks whether the client application is still active. Similarly, the client program periodically checks whether the helper program is still active. This way, in case, the client process is terminated, the helper program restarts the client application and in case the helper program is terminated, the client application restarts the help program. When the client application is restarted, the process identifier will change and will be sent in a notification message to the server. The server application may determine on the basis of the information in the notification message, in this case a change in the process ID of the client application running on a particular mobile device, that the user tried to terminate the client application. In that case, the server application may sent an alert message, e.g. a text message or an email, to the mobile device warning the user that the user should not terminate the client application.

Meanwhile, the server application may start collecting information about the status of the client application and the mobile device (e.g. status information on the location service and short-range data communication interfaces, e.g. Bluetooth interface) on the basis of the information in the notification messages that are sent by the client application to the server. For example, the server application may detect changes in the status information of the mobile device and determine that a predetermined change, e.g. termination of the Bluetooth interface of the mobile device, is considered as tampering with the client application. In that case, the server will send an alert message to the user for notifying the user to activate certain functions, e.g. the location service and/or the short-range data connection, e.g. Bluetooth, interface.

The client application is further configured to monitor for presence messages that are transmitted, e.g. broadcast, by a user detection device 104 that is located in the vehicle 106 of the user of the mobile device. The presence messages transmitted by the user detecting device may comprise an identifier, e.g. a MAC address, for identifying the user detection device. Further, the user detection device may comprise a motion detector 112, e.g. an accelerometer, for detecting if the vehicle is moving. A processor in the user detection device may be configured to periodically or regularly transmit, e.g. broadcast, presence messages when the motion detector detects that the vehicle is moving. Hence, once the client application starts receiving the presence messages, it may check whether the messages originate from a user detector device that is registered with the client application. In an embodiment, the client application may check whether the identifier in the presence message matches an identifier stored in the memory of the mobile device when the client application was installed and registered with the server application.

Once the client application receives a presence message, it determines that the user is driving or has commenced driving the vehicle. In that case, the client application may start monitoring the speed of the vehicle, e.g. by using the information of the location service of the mobile device. If the client device determines that the speed of the vehicle passes a predetermined threshold, e.g. 10 km/hr, it may lock the mobile device, e.g. by locking the screen or by turning the mobile phone in a sleep mode, so that the user is not able to access functions of the mobile device, in particular the communication functions, of the mobile device that may distract the driver. If the client application determines that the speed of the vehicle is below the thresholds, it may unlock the mobile device so that the user can access its communication functions. In a further embodiment, the client apparatus may unlock the mobile device if it determines that the vehicle stopped.

During driving, i.e. during the time that the client application determines that the vehicle speed is above the predetermined threshold and, optionally, during the time that the client application receives presence messages from the user detecting device, the client application monitors information associated with the user detecting device, the user interaction with the mobile device and/or the motion of the vehicle. This information may be sent in a presence message to the server which may collect and store the data in a memory.

Based on the collected information the server application may determine that the user tries to unlock the mobile device or tries to access certain communication function of the mobile device during driving. In that case, the application server may send an alert message to the mobile device to notify the user.

Hence, the system in FIG. 1 uses a client application that actively locks a mobile device during driving and continuously notifies a server that the client application is running as a background process in the mobile device. The notification messages sent by the client application include information that allow the server to determine if the user is tampering with the client application, e.g. tries to terminate the client application, tries to disconnect the mobile device from the server and/or user detection device, or tries to access a function of the mobile device while the vehicle is moving.

The system further comprises a user detection device located in the vehicle of the user of the mobile device, wherein the user detection device comprises a motion sensor wherein a processor in the user detection device is configured to start broadcasting presence messages as soon as the motion sensor detects that the vehicle is in motion, e.g. as soon as the motion detected by the motion sensor is above a certain threshold.

Once the client application is brought in a relatively short range with a user detection device that is located in the vehicle and it detects presence messages broadcast by the user detection device, it will lock the mobile device. Once no motion is detected, the user detection device may stop broadcasting presence messages so that, in response, the client application unlocks the mobile device.

The system thus provides a simple low-cost solution, can be used with any mobile device and that actively intervenes when user tries to tamper (e.g. terminating data connection between user detection device and mobile device, e.g. by turning of the Bluetooth interface, undo lock screen, terminate the client application, etc.).

Figure 2:
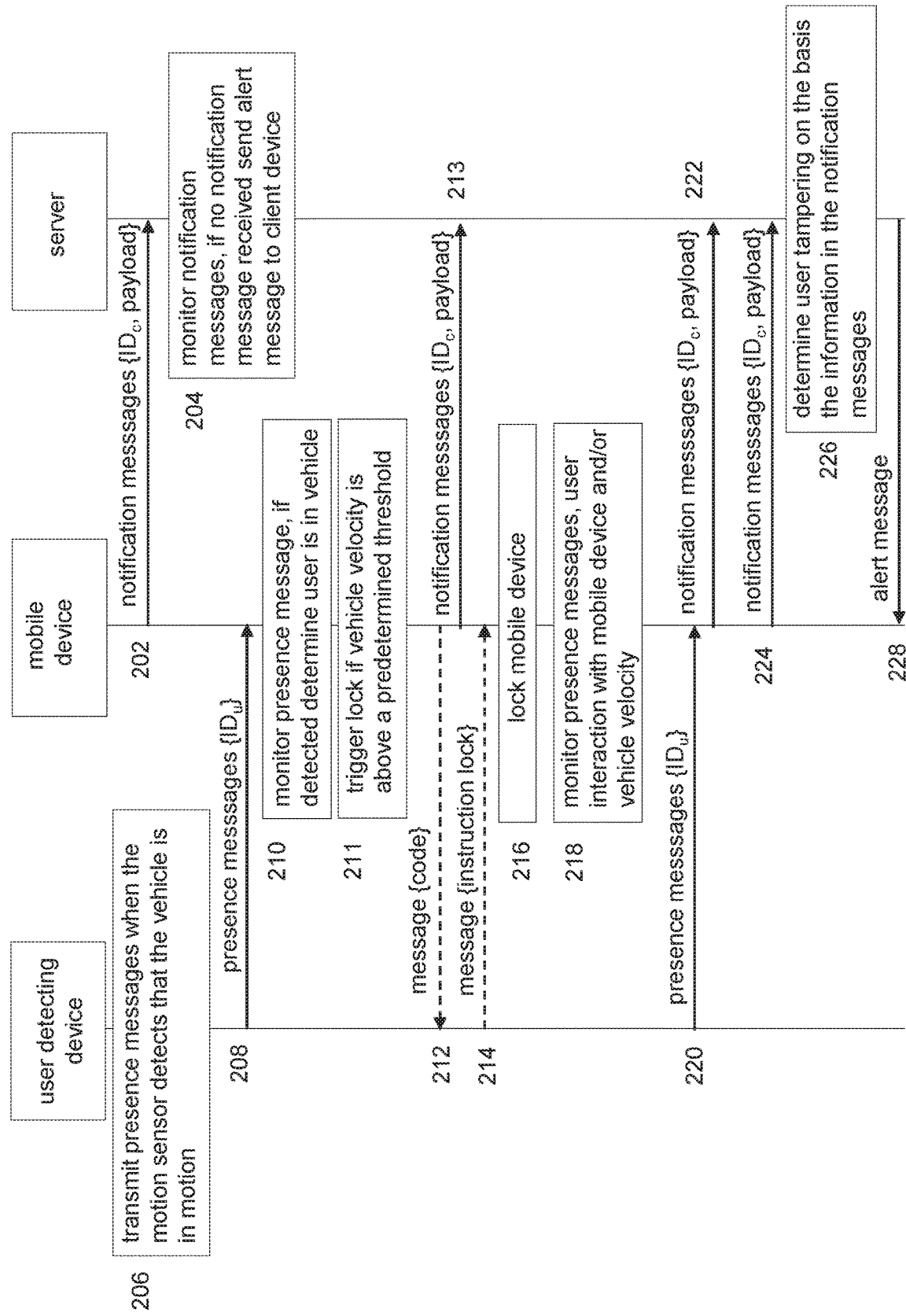
FIG. 2 illustrates a flow chart of a method according to an embodiment of the invention.

FIG. 2 illustrates a flow chart of a method according to an embodiment of the invention. The process may be executed by a system as described with reference to FIG. 1. Here, the method may include a client application in a mobile device sending a notification message to a server application in a server, wherein the notification messages may comprise an client identifier and information about the status of certain functions of the mobile device, e.g. a location service and/or short-range data connection interfaces such as a Bluetooth interface (step 202).

Upon installing the client application on the mobile device, the client application and mobile device are registered with the server so that the server knows that a client application that is transmitting notification messages should be running in the background of the registered mobile device. The server application may monitor the notification messages and the information therein (step 204) and if the server does not receive notification messages of the registered mobile device within a predetermined period, the server application may send an alert message to the mobile device informing the user of the mobile device to undo the tampering, e.g. restart the client application or turn on the short-distance data connection interface, e.g. the Bluetooth interface of the mobile device.

The client application may further monitor for presence messages transmitted by a user detecting device that is located in the vehicle of the user of the mobile device, wherein the user detecting device transmits presence messages if it detects movement of the vehicle (step 208). The presence messages may be transmitted over a short-range data connection based on e.g. Bluetooth or Bluetooth Low Energy (LE).

In an embodiment, if presence messages are received by the client application, it may check whether the device identifier in the presence messages, e.g. the MAC address of the user detecting device, matches a device identifier that was registered with the client application. Hence, the user detecting device may be registered with the client application so that the client application can check if the presence messages received by the mobile device originate from the user detecting device of the user of the mobile device as identified during the registration of the client application with the server. If the client application determines that the device identifiers match, it may determine that the user is in the vehicle (step 210). In that case, the client application may start determining the speed of the vehicle using information from the location service of the mobile device, e.g. the GPS module. If the client application determines that the speed passes a certain threshold (step 211) it may trigger the mobile application to lock the mobile device, e.g. by locking the user interface, e.g. the graphical user interface and/or voice control user interface (step 216), or e.g. the entire screen.

In some embodiments, the Operating System (OS) of the mobile device may not allow a client application to disable or lock the user interface (UI) of the mobile device. In that case, the user detecting device may be configured as a Bluetooth module wherein the data connection between the client application and the user detecting device is based on a Bluetooth low energy (LE) protocol. This protocol allows communication between devices on the basis of profiles, wherein the Human Interface Device standard profile may be used to send a code, a key combination, to the mobile device which will lock the screen of the mobile device. Hence, in this embodiment, the client application may trigger transmission of a message over the Bluetooth interface of the mobile device to the user detecting device (step 212). The message may comprise a code that triggers the user detecting device to send a message, e.g. a HID profile code, comprising a code for instructing the mobile device to lock its screen (step 214). This way, the mobile device may be locked even if the operation system does not allow the client application to directly block the user from accessing functions of the mobile device.

Meanwhile, the client application may continue to send notification messages to the server in order to notify the server application that the client application is running (step 213). Once locked, the client application may monitor information (step 218) associated with the user detecting device (e.g. reception of presence messages 220, time stamp of the presence messages), user interaction with the client application (e.g. interaction with the touch screen or a hands-free user interface, e.g. a voice-controlled user interface), the speed and/or location of the vehicle, status information on the client application (e.g. running in the background or foreground), status information of the mobile device (e.g. GPS module and/or Bluetooth interface on or off), etc.

During the monitoring process, the monitored information may be sent periodically or regularly in notification messages (steps 222 and 224) to the server, which may store the monitored information and determine on the basis of this information whether the user tampers with the client application or the mobile device that runs the client application. If the server detects tampering on the basis of the information in the notification messages (step 224), it may send an alert message, e.g. a text message or an email, to the user (step 228). In response to receiving the alert message, the mobile device may notify the user, for example by at least one of displaying a notification and generating a sound signal, that he should not tamper with the mobile device lock.

Further, if agreed with the employer or insurance company or the like, a message may also be sent to the employer or insurance company etc. Further, a weekly, monthly or quarterly report is produced by the system, that informs the employer or insurance company etc. on the tampering behavior of the employees. Based on this report the employer or insurance company etc. can take actions against the employee, e.g. increase of the insurance premium, increase of the own risk, etc.

The notification message transmitted by the client application may be configured as an HTTP message, e.g. an HTTP POST message, which may be sent to the server which can be addressed by the client application on the basis of an URL. The notification messages may be related to regular data logging, including information on time, distance, velocity, etc. In addition, a notification message may be sent in case the client application determines information that could be interpreted as a tampering event, e.g. the data connection between the In an embodiment, a notification message may comprise a string of parameters, preferably a string of parameters according to the JSON protocol. In the JSON string one or more of the following parameters may be inserted: telephone_number, timestamp, MAC address of user detecting device, status user detecting device, battery, event, maximum_speed in last time interval, app_foreground, app version, emergency button pressed, distance, os version, phone type. An example of such JSON string is provided hereunder:

{"BLE_MAC":"8C:8B:83:42:9E:C8","BLE_name": "Car 1","BLE_status":"BLE turned on","Distance": "158729","Emergency":"n/a","Event":"Moving","Ma x_speed":"66.7","Telephone_number":"+31612345678", "app_foregro und":"false","app_version":"0.5(30)","os_ version":"Android 6.0.1","phone_type":"Samsung","timestamp":"2016-12-10T10:23:51+01:00"}

Hence, a notification comprising such string may signal the server that at 2016-12-10T10:23:51+01:00 a user-detecting device, in this case a Bluetooth Low Energy (BLE)

device, is connected to a mobile device of a user of a vehicle, in this case a Samsung smartphone running on Android 6.0.1. and telephone number +31612345678, which has a client application running in the background wherein the application is configured to connect to the user-detecting device and to determine if the vehicle is moving and—if so—to measure the motion of the vehicle, e.g. in terms of speed and distance.

The information in the notification messages may be stored by the server and stored in a database. In an embodiment, the server application may determine tampering on the basis of the Event parameter, wherein an Event may include user detecting device turned on or turned off, vehicle not moving or moving, start app or terminate app, start call, stop call, etc.

Figure 3:
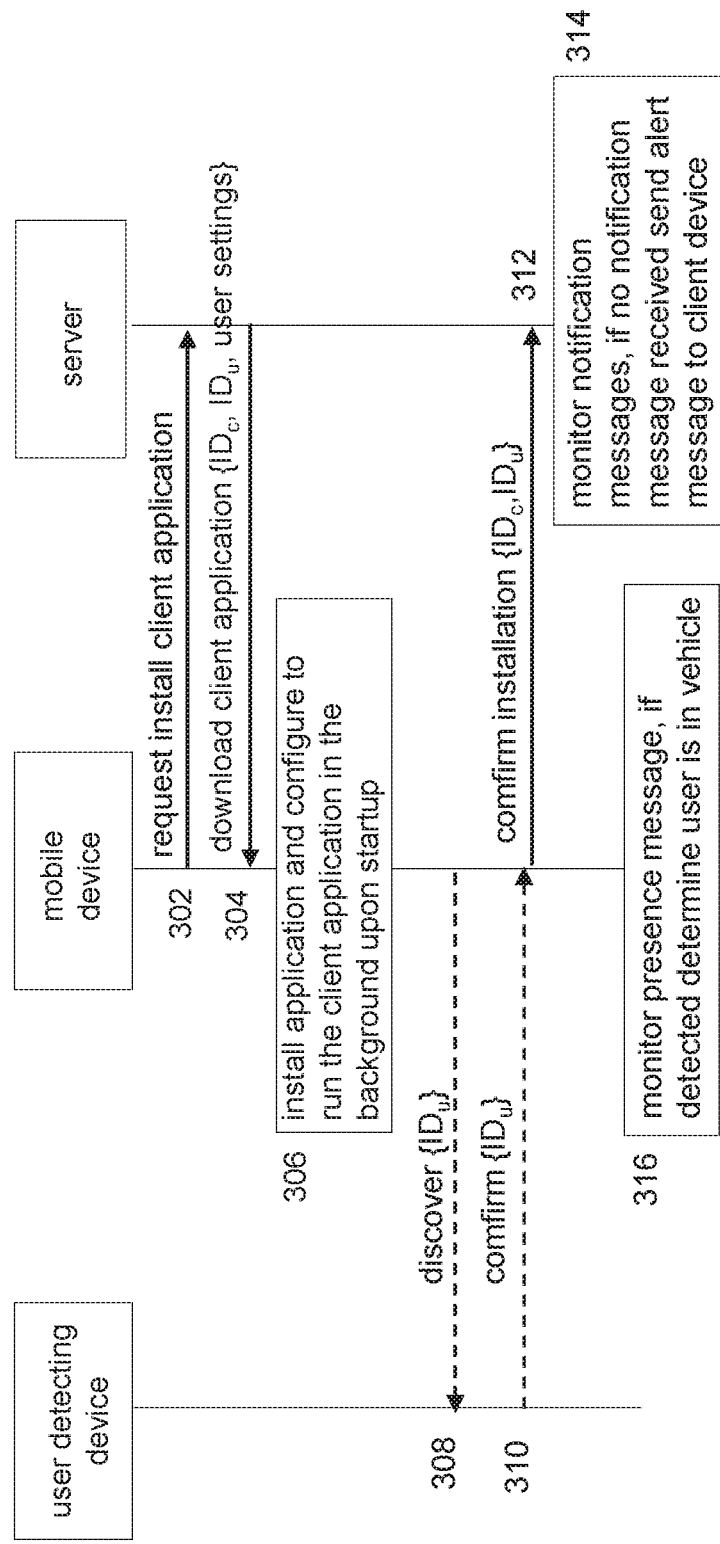
FIG. 3 illustrates a flow chart of a method according to another embodiment of the invention.

FIG. 3 illustrates a flow chart of a method according to another embodiment of the invention. In particular, FIG. 3 depicts part of a method of installing a client application on a mobile device and registering the client application with the server. The method may include the mobile device requesting to install a client application for locking the mobile device when it is in moving vehicle (step 302). In response, the mobile device may receive (download) code for installing the client application on the mobile device. The installed client application may be identified by an identifier IDc. Optionally, the installation information may include a user detecting device identifier IDu and/or user settings information. For example, the user setting information may configure the client application to allow certain functions, e.g. hands-free calls, during driving while locking the mobile device for all other functions.

When installing, the client application may be configured to run in the background of the mobile device. Further, the client application may be started each time when the mobile device is rebooted (step 306). Optionally, as part of the installation, the client device may also initiate a discovery procedure for registering the user detecting device with the client application (step 308). In an embodiment, the discovery procedure may include transmitting messages comprising an identifier of a user detecting device. If the discovery message is received by a user detecting device identified by the identifier in the discovery message, then the user detecting device may send a confirmation message to the client application (step 310). Thereafter, when the client application is successfully installed, a confirmation message comprising identification information associated with the client application and, optionally, the user detecting device may be sent to the server (step 312). The server application may then start monitoring for notification message (step 314) and the client application may start monitoring presence devices (step 316) in a similar way as described with reference to FIG. 3.

Figure 4:
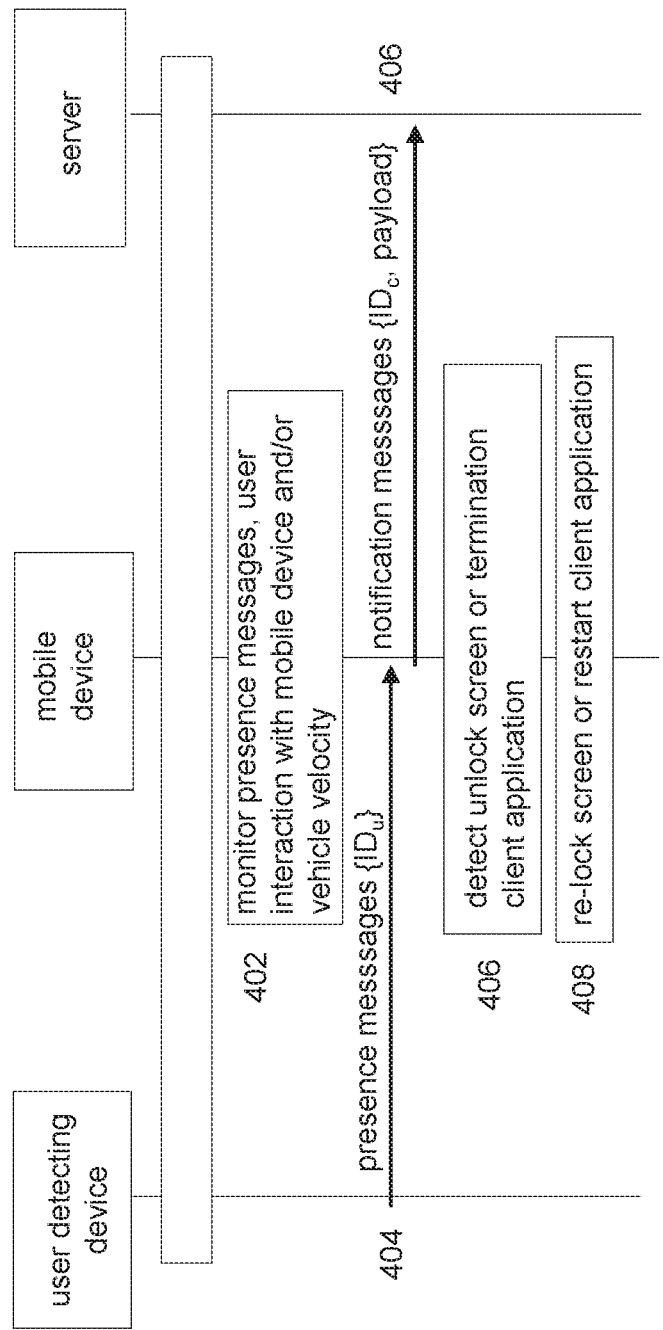
FIG. 4 illustrates a flow chart of a method according to further embodiment of the invention.

FIG. 4 illustrates a flow chart of a method according to further embodiment of the invention. In particular, FIG. 4 depicts part of a method wherein the client application as described with reference to FIG. 1-3 is monitoring information (step 402) associated with the user detecting device (e.g. presence messages transmitted by the user detecting device 404), the mobile device (status Bluetooth interface, GPS module, user interaction etc.), the client application (terminated, running in the foreground or background) and the vehicle (e.g. speed and location). Further, the client application is transmitting notification messages comprising the monitored information (as payload) to the server (step 406).

In this embodiment, the client application may detect that that the user is interacting with the mobile device in order to unlock the screen or terminate the client application. In that case, if the user somehow manages to unlock the screen, the client application may directly re-lock the screen. In an embodiment, the re-locking may include the client application sending a code to the user detecting device to trigger the user detecting device to send a message comprising a key to lock the screen to the client application as described in detail with reference to steps 212 and 214 of FIG. 2.

Figure 5:
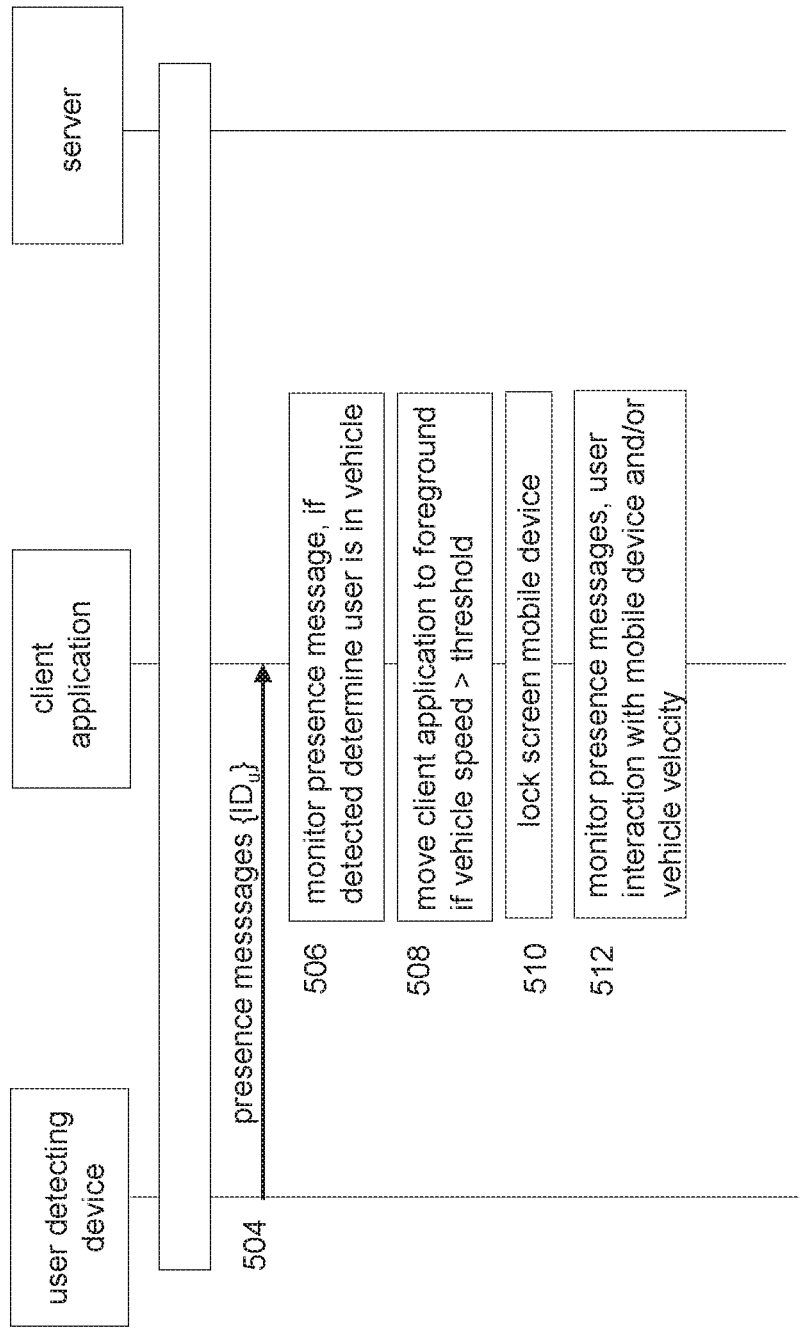
FIG. 5 illustrates a flow chart of a method according to yet a further embodiment of the invention.

FIG. 5 illustrates a flow chart of a method according to yet a further embodiment of the invention. In particular, FIG. 4 depicts part of a method wherein the client application as described with reference to FIG. 1-4 is receiving a presence message by a user detecting device that detects that the vehicle is moving and wherein the wherein the client application determines upon reception of the presence message that the user of mobile device comprising the client application is in the vehicle. If the client application detects that the driver is in the vehicle and the speed of the vehicle passes a predetermined threshold, the client application may change from a background process to a foreground process. The client application as a foreground process may be configured so that the mobile device is locked, i.e. the user cannot access the user functions, as long as the client application is a foreground process.

In one embodiment, the client application may be configured to lock the mobile device by rendering a graphical overlay on top of the Graphical User Interface (GUI) of the mobile device. In an embodiment, the graphical overlay does not comprise functional areas that allow a user to interact with the GUI. This way, a user is prevented from interacting with the mobile device, e.g. to interact with applications running behind the graphical overlay. The graphical overlay may be presented even if the client application runs in the background, for example because the user has pressed a "home button" of the mobile device. The graphical overlay prevents a user to access applications that are "behind" the graphical overlay. Hence, even if the client application is running in the background, the user may still not be able to see other applications or notifications on the mobile device.

The graphical overlay may be configured such that a user is not able at all to interact with the graphical overlay, for example such that the overlay does not accept any input from a touch screen. Alternatively, the graphical overlay comprises an area with which a user indeed is able to interact. In an example the area is an emergency button in the overlay. A user interaction with this area on the display may result in the mobile device unlocking. This enables that a user, in case of an emergency, is able to unlock and use the mobile device. A user interaction with the area may be reported to the server by the mobile device.

Thereafter, the client application may start monitoring information associated with the user detection device, the mobile device, the client application and the vehicle in a similar way as described above in relation to FIG. 1-4.

If the speed of the vehicle is below the threshold, the client application may be moved back to the background and access to the functions of the mobile device is again possible.

Figure 6:
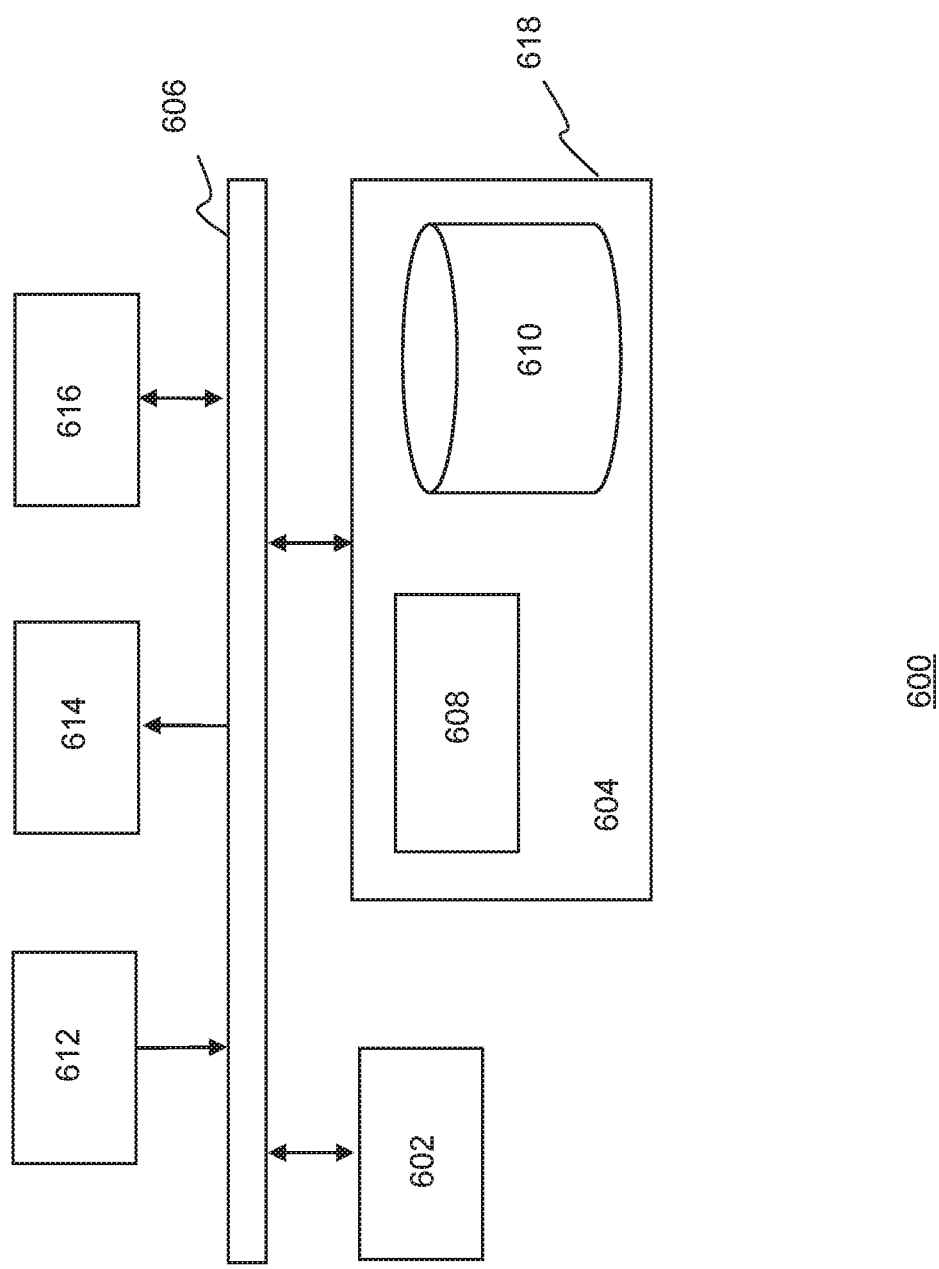
FIG. 6 depicts a block diagram illustrating an exemplary data processing system that may be used with embodiments described in this disclosure.

FIG. 6 is a block diagram illustrating an exemplary data processing system that may be used as described in this disclosure. Data processing system 600 may include at least one processor 602 coupled to memory elements 604 through a system bus 606. As such, the data processing system may store program code within memory elements 604. Further, processor 602 may execute the program code accessed from memory elements 604 via system bus 606. In one aspect, data processing system may be implemented as a computer that is suitable for storing and/or executing program code. It should be appreciated, however, that data processing system 600 may be implemented in the form of any system including a processor and memory that is capable of performing the functions described within this specification.

Memory elements 604 may include one or more physical memory devices such as, for example, local memory 608 and one or more bulk storage devices 610. Local memory may refer to random access memory or other non-persistent memory device(s) generally used during actual execution of the program code. A bulk storage device may be implemented as a hard drive or other persistent data storage device. The processing system 600 may also include one or more cache memories (not shown) that provide temporary storage of at least some program code in order to reduce the number of times program code must be retrieved from bulk storage device 610 during execution.

Input/output (I/O) devices depicted as input device 612 and output device 614 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 616 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 650.

As pictured in FIG. 6, memory elements 604 may store an application 618. It should be appreciated that data processing system 600 may further execute an operating system (not shown) that can facilitate execution of the application. Application, being implemented in the form of executable program code, can be executed by data processing system 600, e.g., by processor 602. Responsive to executing application, data processing system may be configured to perform one or more operations to be described herein in further detail.

In one aspect, for example, data processing system 600 may represent a client data processing system. In that case, application 618 may represent a client application that, when executed, configures data processing system 600 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 618, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of preventing tampering of an electronic mobile device lock on a mobile device in a vehicle comprising:
   a client application in the mobile device monitoring reception of presence messages transmitted by a user-detecting device in the vehicle, the user-detecting device comprising a motion sensor and a radio interface configured to wirelessly transmit presence messages when the motion sensor detects that the vehicle is moving;
   the client application repeatedly wirelessly transmitting notification messages to a server in a network, the notification messages signaling the server that the client application is operational in the mobile device;
   the client application determining on a basis of a received presence message that a user of the mobile device is inside the vehicle;
   the client application monitoring a velocity of the vehicle and determining that the velocity of the vehicle is above a predetermined threshold and, based on the velocity of the vehicle being above the predetermined threshold, electronically locking the mobile device with the electronic mobile device lock for preventing the user to access the mobile device;
   the client application monitoring user interaction with the mobile device and transmitting information associated with user-detecting device and/or the mobile device and/or the client application being operational in the mobile device and/or a location and/or speed of the vehicle in the notification messages to the server, the notification messages comprising an indication
      that the server uses to detect that the user is tampering with the electronic mobile device lock on said mobile device, and/or
      that the server uses to detect that the user has turned off the radio interface configured to wirelessly receive presence messages while keeping the mobile device switched on and/or
      that the server uses to detect that the user attempts to unlock the mobile device, and/or
      that the server uses to detect that a distance travelled, estimated using GPS on the mobile device, is lower than expected and/or that the server uses to detect that the user has turned off the user-detecting device and/or
that the server uses to detect that the user has tried to disconnect the mobile device from the server and/or user detection device; and
the mobile device receiving a warning message from the server for notifying the user of the mobile device that the tampering should be stopped.

2. The method according to claim 1, further comprising the client application providing information in the notification messages that the server uses to detect that the user has pressed an emergency button and/or that the user has terminated the client application.

3. The method according to claim 1 and further comprising, based on the presence message being received by the client application, establishing a data connection between the user-detecting device and the mobile device.

4. The method according to claim 1 further comprising:
a further client application periodically or regularly determining a status of the client application and determining that the status of the client application indicates that the client application is terminated; and
based on the client application being terminated, the further client application restarting the client application.

5. The method according to claim 4 further comprising:
the client application periodically and regularly determining a status of the further client application and determining that the status of the further client application indicates that the further client application is terminated, and
based on the further client application being terminated, the client application restarting the further client application.

6. The method according to claim 1 wherein locking access to the mobile device comprises:
the client application sending a locking code via a wireless data connection to the user-detecting device; and
the user-detecting device transmitting in response to reception of the locking code, an instruction to the mobile device to lock a screen of the mobile device or to switch the mobile device into an idle mode.

7. The method according to claim 1 wherein the presence message comprises an identification code of the user-detecting device.

8. The method according to claim 7 wherein the identifications code comprises a MAC address of the user-detecting device.

9. The method according to claim 1 wherein comprising the client application providing information in the notification messages
that the server uses to detect that the user has turned off the radio interface configured to wirelessly receive presence messages while keeping the mobile device switched on.

10. The method according to claim 1 further comprising the client application providing information in the notification messages that the server uses to detect that the user interacts with the locked mobile device.

11. The method according to claim 1 wherein the client application is configured to execute method steps as a background process.

12. The method according to claim 1 wherein the notification messages comprise status information of the radio interface.

13. The method according to claim 1 wherein the notification messages comprise user interaction events.

14. The method according to claim 1 wherein the notification messages comprise detected or estimated speed.

15. The method according to claim 1 comprising the client application providing information in the notification messages that the server uses to detect that the user attempts to unlock the mobile device.

16. The method according to claim 1 comprising the client application providing information in the notification messages that the server uses to detect that a distance travelled, estimated using GPS on the mobile device, is lower than expected.

17. The method according to claim 1 comprising the client application providing information in the notification messages that the server uses to detect that the user has turned off the user-detecting device.

18. The method according to claim 1 comprising the client application providing information in the notification messages that the server uses to detect that the user has tried to disconnect the mobile device from the server and/or user detection device.

19. A client device for preventing tampering of an electronic mobile device lock on a mobile device in a vehicle comprising:
a computer readable storage medium having computer readable program code embodied therewith; and
a processor coupled to the computer readable storage medium, wherein responsive to executing the computer readable program code, the processor is configured to perform executable operations comprising:
monitoring reception of presence messages transmitted by a user-detecting device in the vehicle, the user-detecting device comprising a motion sensor and a radio interface configured to wirelessly transmit presence messages when the motion sensor detects that the vehicle is moving;
repeatedly wirelessly transmitting notification messages to a server in a network, the notification messages signaling the server that the program code is operational in the mobile device;
determining on a basis of a received presence message that a user of the mobile device is inside the vehicle;
monitoring a velocity of the vehicle and electronically locking the mobile device lock for preventing user access to the mobile device when the velocity of the vehicle is above a predetermined threshold;
monitoring user interaction with the mobile device and transmitting information associated with the user-detecting device and/or the mobile device and/or the program code being operational in the mobile device and/or a location and/or speed of the vehicle in the notification messages to the server; and
receiving a warning message from the server for notifying the user of the mobile device that the tampering should be stopped, if the program code provides information in the notification messages an indication that the server uses to detect that the user is tampering with the electronic mobile device lock on said mobile device, wherein
the warning message is received,
if the program code provides information in the notification messages that the server uses to detect that the user has turned off the radio interface configured to wirelessly receive presence messages while keeping the mobile device switched on, and/or
if the program code provides information in the notification messages that the server uses to detect that the user attempts to unlock the mobile device, and/or if the program code provides information in the notification messages that the server uses to detect that a distance travelled, estimated using GPS on the mobile device, is lower than expected, and/or if the program code provides information in the notification messages that the server uses to detect that the user has turned off the user-detecting device, and/or if the program code provides information in the notification messages that the server uses to detect that the user has tried to disconnect the mobile device from the server and/or user detection device.

20. A system for preventing tampering of an electronic mobile device lock on a mobile device when a user of the mobile device is driving a vehicle, the system comprising a client application in the mobile device, a user-detecting device and a server:

the client application being configured to monitor reception of presence messages transmitted by the user-detecting device in the vehicle, the user-detecting device comprising a motion sensor and a radio interface, the user-detecting device being configured to wirelessly transmit presence messages when the motion sensor detects that the vehicle is moving of the user-detecting device;

the client application being configured to repeatedly wirelessly transmit notification messages to the server in a network, the notification messages signaling the server that the client application is operational in the mobile device;

the client application being configured to determine on a basis of a received presence message that the user of the mobile device is inside the vehicle;

the client application being configured to monitor a velocity of the vehicle and to electronically lock the mobile device for preventing the user to access the mobile device if the velocity of the vehicle is above a predetermined threshold;

the client application being configured to monitor user interaction with the mobile device and transmit information associated with the user-detecting device and/or the mobile device and/or the client application being operational in the mobile device and/or a location and/or speed of the vehicle in the notification messages to the server; and, the mobile device being configured to receive a warning message from the server for notifying the user of the mobile device that the tampering should be stopped, if the client application provides information in in the notification messages an indication that the server uses to detect that the user is tampering with the electronic mobile device lock on said mobile device, wherein the mobile device is configured to receive the warning message, if the client application provides information in the notification messages that the server uses to detect that the user has turned off the radio interface configured to wirelessly receive presence messages while keeping the mobile device switched on, and/or if the client application provides information in the notification messages that the server uses to detect that the user attempts to unlock the mobile device, and/or if the server detects on the basis of the information in the notification messages that a distance travelled, estimated using GPS on the mobile device, is lower than expected, and/or if the client application provides information in the notification messages that the server uses to detect that the user has turned off the user-detecting device, and/or if the client application provides information in the notification messages that the server uses to detect that the user has tried to disconnect the mobile device from the server and/or user detection device.

* * * * *